United States Patent [19]
Lima

[11] 3,737,751
[45] June 5, 1973

[54] SERVOMECHANISM STOP CONTROL
[75] Inventor: Philip J. Lima, Boulder, Colo.
[73] Assignee: International Business Machines Corporation, Armonk, N.Y.
[22] Filed: June 24, 1971
[21] Appl. No.: 156,222

[52] U.S. Cl. .................. 318/463, 318/341, 318/373, 318/375, 318/398
[51] Int. Cl. .............................................. H02p 5/06
[58] Field of Search ..................... 318/603, 612, 618, 318/341, 373, 374, 375, 450, 463, 398; 226/24

[56] References Cited
UNITED STATES PATENTS

| | | | |
|---|---|---|---|
| 3,376,486 | 4/1968 | Caputo | 318/345 X |
| 3,452,853 | 7/1969 | Mabon | 318/398 X |
| 3,648,141 | 3/1972 | Scheer | 318/314 |
| 3,470,428 | 9/1969 | Gill et al. | 318/612 X |
| 3,185,364 | 5/1965 | Kleist | 226/24 |
| 3,458,787 | 7/1969 | Grebe et al. | 318/603 X |
| 3,482,155 | 12/1969 | Fredriksen | 318/603 X |
| 3,571,685 | 3/1971 | Akins | 318/603 |
| 3,621,354 | 11/1971 | Fawcett | 318/618 X |
| 3,614,757 | 10/1971 | Burr | 318/341 X |

Primary Examiner—B. Dobeck
Attorney—Francis A. Sirr

[57] ABSTRACT

Rotation of a direct current motor is brought to a stop in a preselected distance by a closed-loop servomechanism which periodically compares the actual motor velocity-versus-distance stop profile to a nominal velocity-versus-distance stop profile, to thereby originate an error signal. This error signal is used to variably control the motor in a manner devised to achieve the nominal profile at the next distance checkpoint.

12 Claims, 11 Drawing Figures

VELOCITY VS.
TIME PROFILE

VELOCITY VS.
DISTANCE PROFILE 3,737,751

SERVOMECHANISM STOP CONTROL

BACKGROUND AND SUMMARY OF THE INVENTION

This invention relates to the general field of electrical motive power systems wherein deceleration is close-loop controlled, for example by braking, or by plugging, that is, by the application of reverse power to the motor.

Prior art is known where stop control of a motor is controlled by switching from a velocity control servomechanism to a position control servomechanism upon the occurrence of a STOP command. In this prior art, the motor is controlled in accordance with a position error signal representative of the difference between a desired motor position and the actual motor position.

Prior art is also known where deceleration of a motor is achieved by plugging the motor. This plugging may take a variety of forms. For example, the plugging waveform may be open-loop controlled, that is, both the magnitude and time duration of the plugging energy are independent of motor velocity or distance traveled. Other prior art devices provide quasi-closed-loop deceleration in that the application of plugging energy is terminated when the motor velocity has decreased to a given level, but again the stop or deceleration control is independent of the distance traveled by the motor.

The present invention provides continuous, or substantially continuous, closed-loop stop or deceleration control by means of a velocity servomechanism which uses both motor-velocity and motor-distance information in order to compare actual motor velocity with the proper point on a nominal velocity-versus-distance stop profile. This comparison results in a velocity error signal which is indicative of the difference between the desired velocity at a given distance and the actual velocity at this distance. This error signal is utilized to control the motor in a manner devised to achieve the nominal profile at the next distance checkpoint.

In its broader aspects, the present invention contemplates the stop control of a motor by measuring the distance traveled by the motor after the occurrence of a STOP command and the velocity of the motor at this distance. The actual motor velocity-versus-distance stop profile is compared to an idealized or standard velocity-versus-distance stop profile. This comparison provides an error signal whenever the two profiles differ, and this error signal is used to control motor energization in a manner devised to achieve the idealized profile at subsequently greater distances into the stop profile.

More specifically, a deceleration or stop mode of operation is instituted by the occurrence of a STOP command, which may be the absence of a GO command. A digital tachometer is driven by the motor and provides an output pulse each time the motor has traveled a given distance into the stop profile. The total number of pulses which have occurred at any given time are a measure of the total distance traveled into the stop profile. The time period between any two adjacent pulses is a close approximation of the velocity of the motor at the time of the latter of the two pulses. Certain of these pulses are selected as distance checkpoints. At each checkpoint a target velocity is selected, in accordance with the nominal stop profile, for the next checkpoint. This target velocity, which may consist of looking for a specific target count in an advancing counter, is compared to actual velocity, as by comparing the target count with the actual count at the next distance checkpoint. This comparison indicates that the motor is fast, nominal or slow relative to the nominal or idealized stop profile, and the motor is controlled accordingly. Also, at the time of comparison, the target velocity is changed to a lower value, that is, a higher count, corresponding to the next distance checkpoint.

This mode of operation continues until a final distance checkpoint is reached, whereupon the motor is brought to a stop, for example under open-loop control such as dynamic braking.

The foregoing and other features and advantages of the invention will be apparent from the following more particular description of the preferred embodiments of the invention, as illustrated in the accompanying drawings.

DETAILED DESCRIPTION OF THE DRAWINGS

Figure 1:
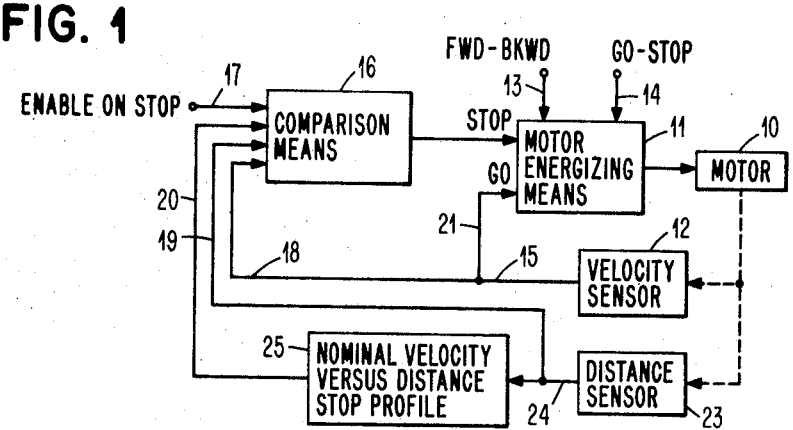
FIG. 1 is a block diagram showing of an embodiment of the present invention, this embodiment being capable of implementation by well-known servo techniques, such as analog or digital.

Referring to FIG. 1, reference numeral 10 designates a motor whose running velocity and stop profile is to be controlled. The running velocity of motor 10 is controlled by motor energizing means 11 which receives actual motor velocity feedback information from motor velocity sensor 12.

Input commands on lines 13 and 14 define "forward," "backward," "go" and "stop" commands for the motor.

As is well known by those of ordinary skill in the art, motor energizing means 11 may take many forms. Digital and/or analog techniques may be used to achieve velocity servomechanism control of motor 10. For example, velocity sensor 12 may consist of a DC tachometer whose output magnitude is indicative of motor speed and whose output polarity is indicative of the direction of motor rotation. This output is presented as an input to motor energizing means 11 by way of conductor 15. Motor energizing means 11 performs the function of comparing this actual velocity feedback to a reference indicative of a desired motor velocity. Velocity error is used to variably control the energization of motor 10 to achieve the desired velocity. By way of another example, velocity sensor 12 may be a digital tachometer whose output consists of a discrete pulse each time motor 10 has traversed a given distance. The time period between any two adjacent output pulses of this digital tachometer can be measured by noting the number of oscillator cycles which has occurred between the two adjacent output pulses. With this distance and time information, actual motor velocity is known. The comparison of actual motor velocity to desired motor velocity may consist of comparing the number of oscillator cycles which have occurred to the number which would have occurred had the motor been running at the desired speed. Any difference is a measure of speed error and this difference is used to modify energization of motor 10 to achieve the desired velocity.

It should be noted at this point that the present invention is not limited to a specific means of achieving running velocity control of motor 10. Two exemplary systems have been described, and other systems will be apparent to those of ordinary skill in the art.

Reference numeral 16 designates a comparison means which is inhibited during the above-described velocity control mode of operation of motor 10. However, on the occurrence of a STOP command on line 14, comparison means 16 is enabled by a signal on line 17. When the comparison means is thus enabled, it is rendered effective to respond to input stimulus on lines 18, 19 and 20.

The occurrence of a STOP command on line 14 inhibits the response of motor energizing means to an input on line 21 and enables a response of the motor energizing means to an input on line 22.

The input on lines 18 and 15 is the actual motor velocity information, this being the output of motor velocity sensor 12. The information available on lines 19 and 24 is the distance traveled by motor 10 since the occurrence of the STOP command, this being the output of motor distance sensor 23. In analog techniques, distance sensor 23 could be accomplished by integrating the output of a direct current tachometer to give a DC signal whose magnitude was indicative of distance traveled.

Figure 2:
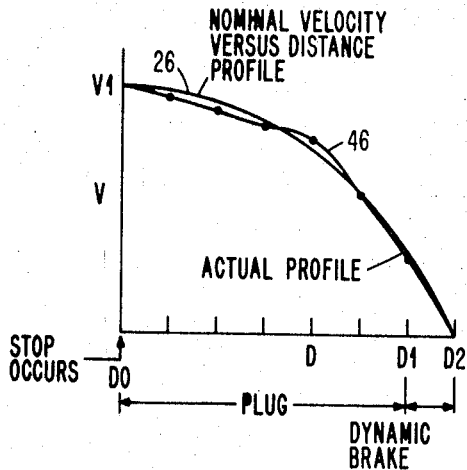
FIG. 2 is a graph which plots motor velocity as a function of the distance traveled by the motor of FIG. 1 from the time of the occurrence of a STOP command, and shows a nominal velocity-versus-distance profile and an actual profile such as many be achieved by the structure of FIG. 1, FIGS. 3 and 4 show the use of the present invention to control the interblock gap of a data processing magnetic tape unit.

The information available on line 20 is the output of network 25. This network provides output information as to a nominal or idealized velocity-versus-distance stop profile which is desired for motor 10. Referring to FIG. 2, this figure is a graphical representation of the motor velocity V plotted as a function of the motor distance D traveled since the occurrence of the STOP command, at distance D0, on line 14. Curve 26 represents the information stored in network 25 and is the nominal velocity-versus-distance profile desired for motor 10 as to motor velocity decreases from running velocity V1 to zero velocity after having traveled the distance D2, this distance being measured from the occurrence of the STOP command at distance D0. As can be seen from FIG. 2, as the distance traveled by the motor increases, the nominal velocity signal which appears on line 20 decreases in magnitude. The actual velocity signal on line 18 is compared to the desired velocity signal on line 20 to originate an output on line 22. This output variably controls motor energizing means 11 in a manner to bring the actual motor velocity-versus-distance profile 46 into coincidence with the nominal profile 26.

By way of a specific example, the apparatus of FIG. 1 may provide error-controlled plugging of motor 10 as the motor travels the distance D0 to D1. At distance D1, the motor may be dynamically braked to a stop.

While the apparatus of FIG. 1 is of general utility, it has been found especially useful in controlling the interblock gap size in a digital data processing magnetic tape unit by utilizing the apparatus of FIG. 1 as the capstan servomechanism of the magnetic tape unit.

Figure 3:
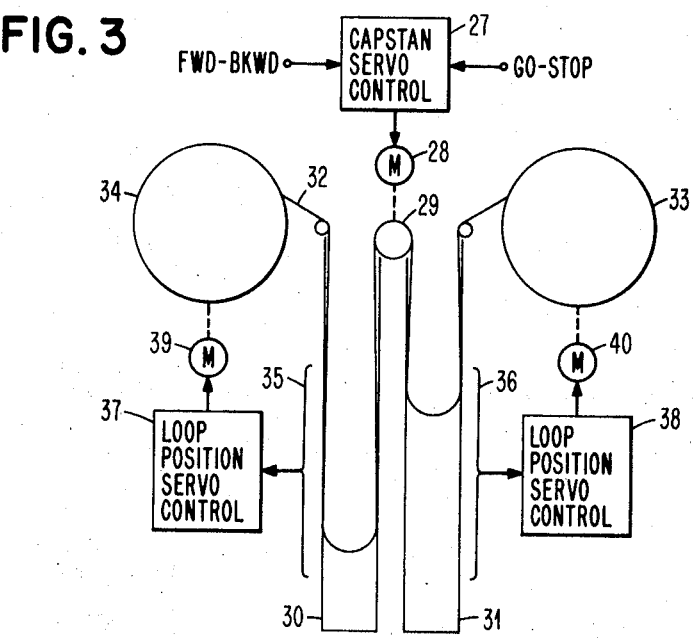

FIG. 3 is a diagrammatic representation of such a tape unit and shows capstan servomechanism 27 connected to control capstan motor 28, the motor being directly connected to a capstan 29. Motor 28 is preferably a high torque-low inertia motor of the printed circuit armature type. Capstan 29 is located intermediate vacuum column tape loop buffers 30 and 31. A length of tape 32 extends between a supply reel 33 and a take-up reel 34.

Each of the vacuum columns includes an operational zone 35 and 36 wherein tape-loop-position detectors are effective to provide an input to loop-position servomechanism control networks 37 and 38. Networks 37 and 38 control reel motors 39 and 40, respectively, to maintain the loop of tape in each column within its operational zone.

Figure 4:
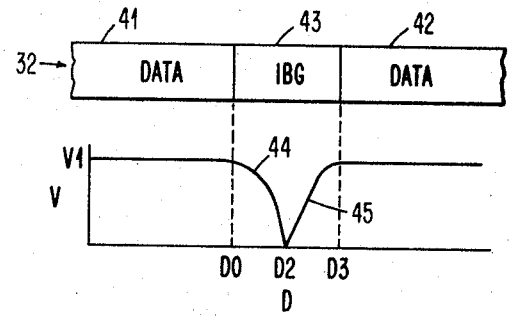

In FIG. 4, a length of tape 32 is shown containing adjacent data blocks 41 and 42, these data blocks being separated by an interblock gap 43. Also associated with this tape is a velocity-versus-distance profile for capstan 29 and its motor 28. From this figure it can be seen that within data blocks 41 and 42, the capstan and motor velocity is maintained at the value V1. However, at the interface of data block 41 and interblock gap 43, a STOP command occurs at distance D0 and the motor and capstan velocity subsequently follows stop velocity profile 44 until the motor, capstan and tape are brought to a stop at distance D2 into the interblock gap. Subsequently, the occurrence of a GO command causes the motor, the capstan and the tape to follow acceleration profile 45. The control of motor 28 is such that there is no tape slip as the motor accelerates and decelerates in the gap.

In practice, the distance D0 to D3 is less than one inch and may, in fact, be a matter of only a few tenths of an inch.

The foregoing description provides a teaching enabling any person skilled in the art to which the present invention pertains to make and use the same. As has been mentioned, the structure of FIG. 1 can be implemented by well-known servomechanism techniques. FIGS. 5, 6, 7, 8 and 9 show the details of a digital implementation of the structure of FIG. 1.

Figure 5:
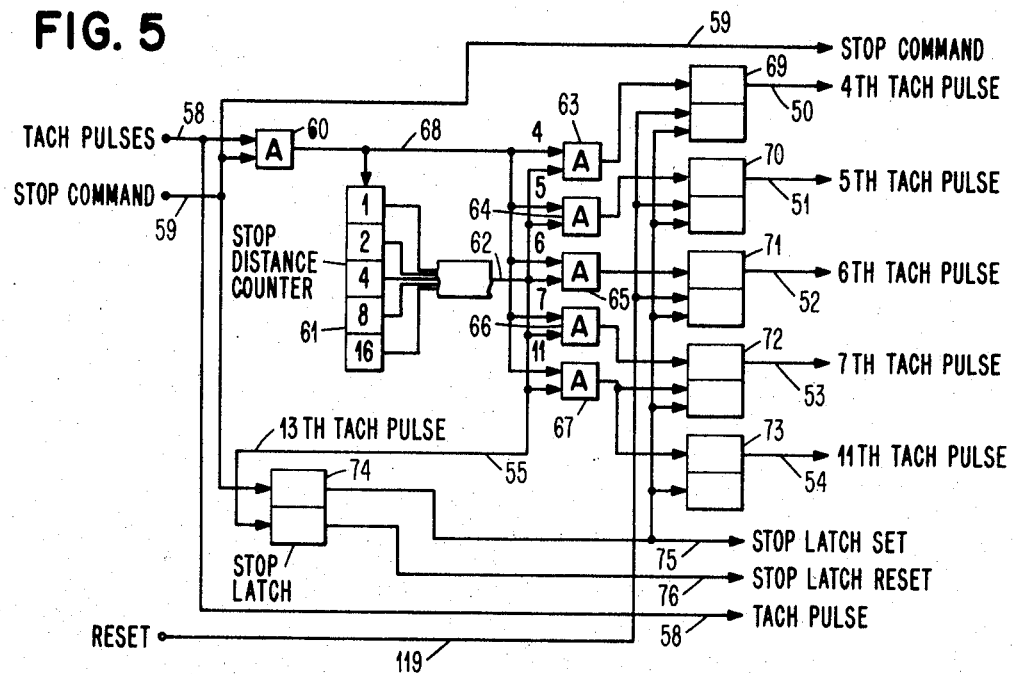
FIGS. 5, 6, 7, 8 and 9 show the details of a digital implementation of the structure of FIG. 1, and FIGS. 10 and 11 show representative graphs of velocity-versus-time and velocity-versus-distance profile, respectively, such as may be achieved by the structure of FIGS. 5–8.
Figure 9:
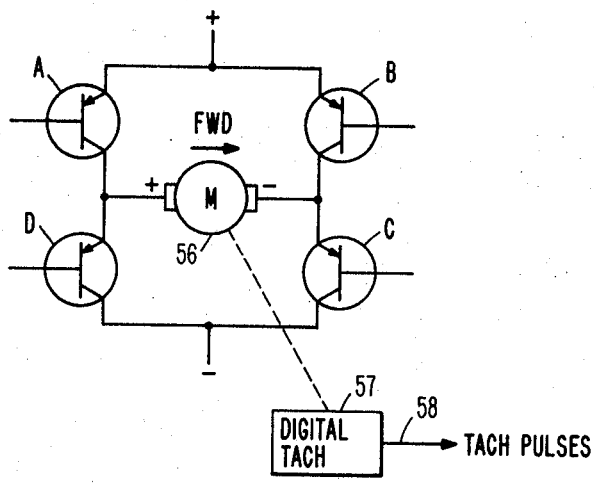

Referring to FIG. 5, the structure disclosed in this figure provides distance information on conductors 50–55. An associated motor 56 of FIG. 9 is connected to drive a digital tachometer 57 and to provide tachometer pulses on conductor 58. The pulse frequency varies directly with the speed of the motor, that is, the faster motor 56 is rotating, the higher the pulse frequency on conductor 58.

The presence of a STOP command on conductor 59, FIG. 5, enables AND gate 60 and tachometer pulses are thus gated to the input of a stop distance digital counter 61. Since each tachometer pulse indicates that the motor has traveled a given distance, the total number of pulses which have occurred since the occurrence of a STOP command is a measure of the distance that the motor has traveled into the stop profile. The state of count of counter 61 is present upon an output conductor arrangement diagrammatically represented by a single conductor 62. The state of this counter is presented to the input of AND gates 63–67, these AND gates being enabled during the time that a tachometer pulse is present on conductor 68. AND gates 63–67 are responsive to the fourth, fifth, sixth, seventh and eleventh tachometer pulses, respectively, and upon the occurrence of these tachometer pulses, the outputs of these AND gates are effective to set distance checkpoint latches 69–73, respectively. These latches, when set, provide an active output on conductors 50–54, respectively, indicating that the recited tachometer pulses have occurred.

The STOP command at conductor 59 is also effective to set bi-stable stop latch 74. This latch, when set, provides an active output on conductor 75. The output on conductor 75 is effective to initialize latches 69–73, placing them in a reset condition.

As indicated by the FIG. 5 legend, the occurrence of the thirteenth tachometer pulse renders conductor 55 active to reset STOP latch 74. When the STOP latch is in its reset state, conductor 76 is active, providing an output indicating that the STOP latch has been reset.

Figure 6:
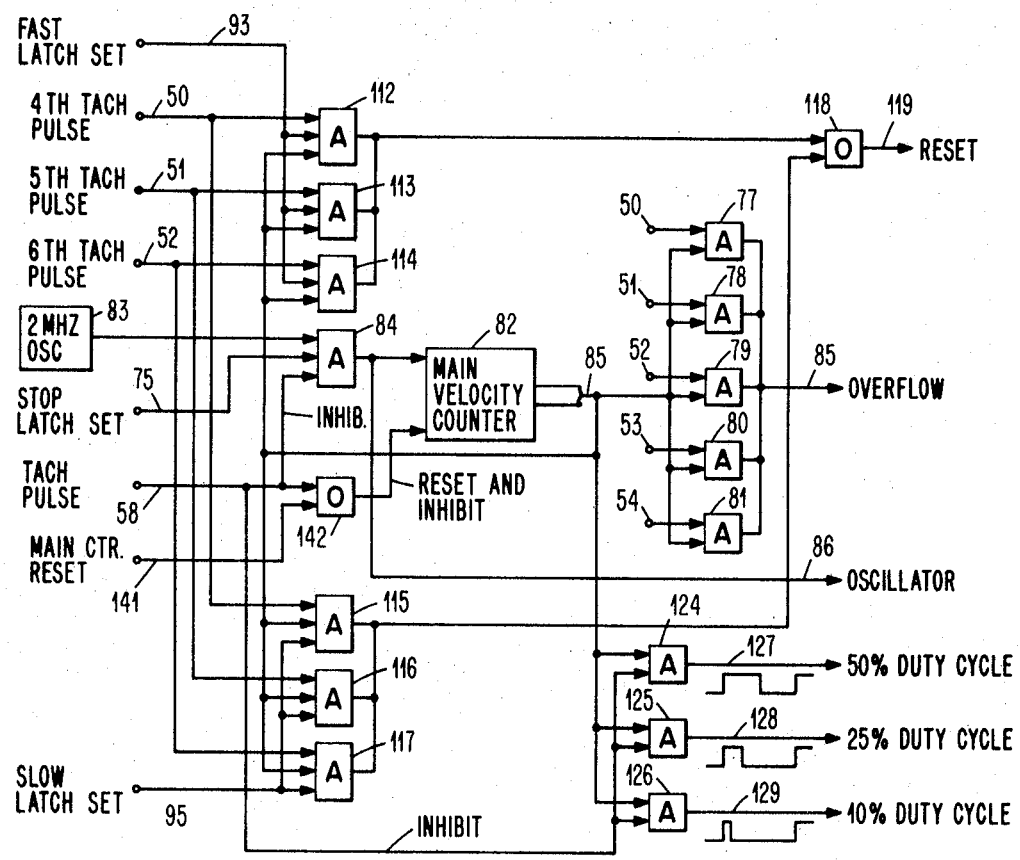
Figure 7:
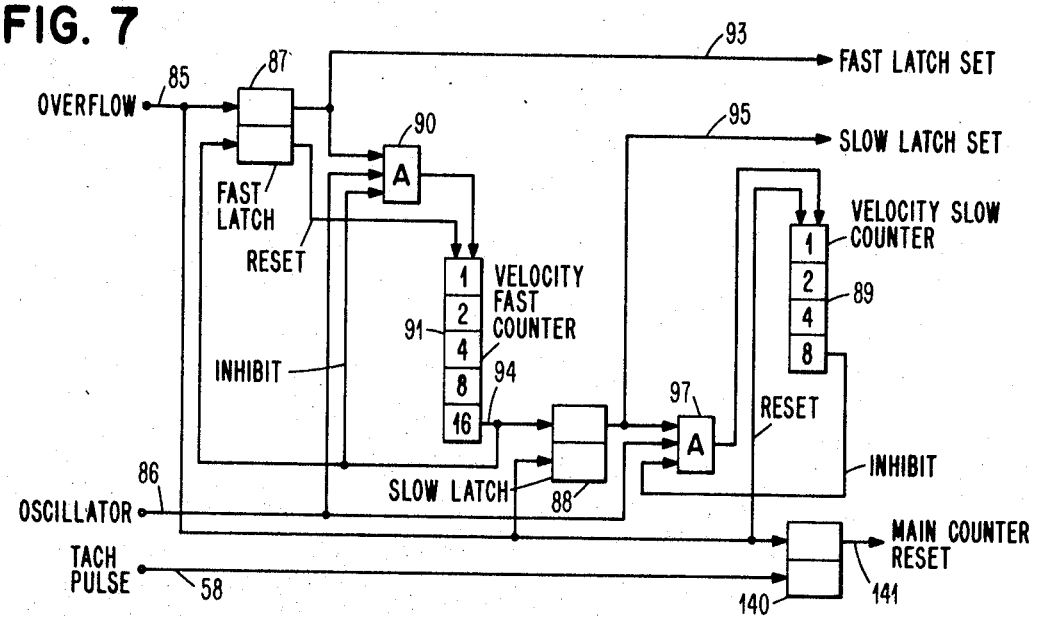

FIGS. 6 and 7 show the structure whereby the nominal velocity-versus-distance stop profile is compared to the actual velocity-versus-distance stop profile. Referring to FIG. 6, conductors 50–54, above discussed in connection with FIG. 5, are connected to the input of AND gates 77–81. Thus, a respective one of the AND gates 77–81 is conditioned to be responsive to a second input only when the motor has achieved a given distance checkpoint (tachometer pulse) and is in the process of moving toward the next distance checkpoint. For example, when the motor has passed the fifth tachometer pulse and is moving toward the sixth tachometer pulse, AND gate 78 is the only active AND gate of the group 77–81.

The second input to each of the AND gates 77–81 is provided by the output of main velocity counter 82. This counter is a large digital counter which is driven by a two-megahertz oscillator 83 through an AND gate 84 which is conditioned when the STOP latch of FIG. 5 is set, rendering conductor 75 active. A tachometer pulse on conductor 54 is effective to reset counter 82 to its initial state, for example a zero count, and to momentarily inhibit gate 84. Thereafter, counter 82 advances and the state of this counter is a measure of the time which has lapsed since the occurrence of the above-mentioned tachometer pulse. The state of count of this counter is present on a conductor arrangement symbolized by a single conductor 85. As shown by the FIG. 6 legends, AND gate 77 is conditioned when counter 82 contains a count of 170; AND gate 78 is conditioned when the counter contains a count of 206; AND gate 79 is conditioned when the counter contains a count of 256; AND gate 80 is conditioned when the counter contains a count of 300; and AND gate 81 is conditioned when the counter contains a count of 456.

Again taking the example where the motor has passed the fifth tachometer pulse but has not as yet reached the sixth tachometer pulse, AND gate 78 is rendered active by a conditioning signal on conductor 51. When counter 82 contains a count of 206, an overflow output appears on conductor 85. The count of 206 is related to the nominal velocity-versus-distance stop profile, as will be apparent, and such a count always occurs even though the motor is stopping unusually fast, meaning that the actual velocity-versus-distance profile is below the nominal profile.

Referring now to FIG. 7, the structure of this figure provides an output indicating that the motor is fast or slow relative to the nominal profile. For the purposes of this discussion, a "fast" motor is one which, unless controlled, would stop in a shorter distance than the desired nominal distance.

The overflow condition is effective to set bi-stable latch 140, thus generating an active output on conductor 141. This output is effective to reset main counter 82 and to inhibit the counter, by way of OR gate 142, FIG. 6, so long as latch 140 remains set. As will be apparent, the next tachometer pulse is effective to reset latch 140; however, the inhibit function generated by OR gate 142 prevents counting of counter 82 until the end of this short tachometer pulse interval.

The overflow condition, above described in connection with FIG. 6, is effective to set bi-stable fast latch 87, reset bi-stable slow latch 88, and reset velocity-slow counter 89 to an initial state such as a zero count. The setting of fast latch 87 conditions AND gate 90 and velocity-fast counter 91 begins to advance by virtue of the oscillator input provided on conductor 86.

If the motor is stopping faster than a nominal stop, the next tachometer pulse will occur before counter 91 has filled.

As will be apparent from the following description, the mode of energization of the motor is controlled to achieve the nominal stop profile. Within the teachings of this invention, structure may be provided to quantitatively control the motor in accordance with the state of count in counter 91. For example, if counter 91 has reached a count of 16 when a tachometer pulse occurs, this is an indiation that even though fast latch 87 is set, the motor is on the nominal profile at the particular distance checkpoint. If the contents of counter 91 are less than full, then the count within the counter is a measure of the deviation of the actual stop profile from the nominal stop profile. The smaller the count within counter 91, the greater the deviation from the nominal profile.

Should the motor be slow, counter 91 will fill and provide an output on conductor 94 before the next tachometer pulse occurs. This output is effective to inhibit AND gate 90, preventing further counting of counter 91. This output resets fast latch 87, removing the active output from conducter 93. This output also sets slow latch 88 and enables AND gate 97 such that velocity-slow counter 89 now begins to count by virtue of the oscillator output present on conductor 86. The size of counter 89 is selected such that the next tachometer pulse will normally always appear before this counter is full.

Here again, the setting of slow latch 88 when a zero or minimal count exists in slow counter 89 is an indication that the motor is on the nominal stop profile at this distance checkpoint. Within the teachings of the present invention, the state of count of counter 89 may be sampled to indicate the deviation of the actual stop profile from the nominal stop profile. In other words, the larger the count in counter 89 at the time of occurrence of the tachometer pulse, the greater the deviation of the actual stop profile from the nominal stop profile.

For the purpose of simplifying the present structure, a gross decision is made since it is assumed that if fast latch 87 is set the motor is stopping too fast, and if slow latch 88 is set the motor is not stopping fast enough.

Figure 8:
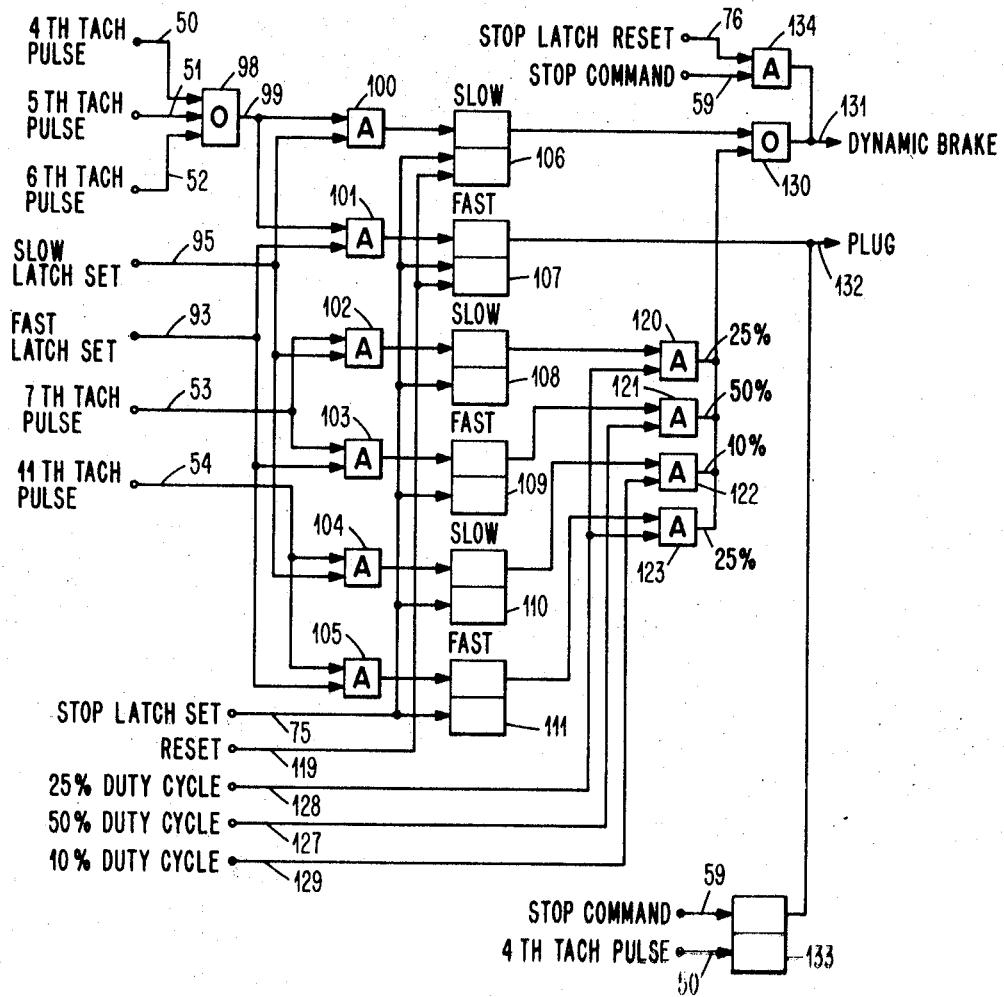

FIGS. 8 and 9 disclose the structure whereby the information developed in FIGS. 5, 6 and 7 is utilized to determine the mode of energization of the motor.

Referring to FIG. 8, AND gates 100, 102 and 104, and bi-stable latches 106, 108 and 110 are active only when slot latch 88 of FIG. 7 has been set. Additionally, latch 106 can be set only when the motor has achieved the fourth, fifth or sixth tachometer pulse distance checkpoint (but has not reached the next checkpoint); latch 108 can be set only when the motor has achieved the seventh tachometer pulse (but has not reached the eleventh pulse); and latch 110 can be set only when the motor has achieved the eleventh tachometer pulse.

AND gates 101, 103 and 105, and bi-stable latches 107, 109 and 111 are active only when fast latch 87 of FIG. 7 has been set. Latch 107 can be set only under the same distance checkpoint conditions as latch 106; latch 109 can be set only under the same checkpoint conditions as latch 108; and latch 111 can be set only under the same checkpoint conditions as latch 110.

Since latches 106 and 107 are utilized in common with three distance checkpoints (the fourth, fifth and sixth tachometer pulses), a means is provided reset these latches after the occurrence of these respective tachometer pulses, and before the occurrence of the subsequent tachometer pulse. This structure is provided by AND gates 112-117 of FIG. 6. AND gates 112 and 115 are conditioned when the motor has passed the fourth tachometer pulse, but has not reached the fifth tachometer pulse. AND gates 113 and 116 are conditioned when the motor has passed the fifth tachometer pulse, but has not reached the sixth tachometer pulse. AND gates 114 and 117 are conditioned when the motor has reached the sixth tachometer pulse but has not reached the seventh tachometer pulse. AND gates 112-114 include an additional input to condition these gates when fast latch 87 of FIG. 7 is set. AND gates 115-117 include an additional input to condition these AND gates when slow latch 88 of FIG. 7 is set. The remaining input to each of these AND gates is a selected count of the main velocity counter 82. While a single conductor 85 is shown connected to each of the gates 112-117, it is recognized that a different count can be selected for each of the gates, since each of the gates represents a different distance-versus-veloctiy condition of the motor in the stop profile.

As will be apparent from the following discussion, the set condition of latches 106 or 107 of FIG. 8 determines a particular mode of energization of motor 56. Depending upon the characteristic of the motor, the mode of operation (either plug of dynamic brake) is maintained until a given count in counter 82 is decoded by the active one of the AND gates 112-117 of FIG. 6. Thereafter, until the occurrence of the next tachometer pulse, the motor is de-energized and operates in a coast mode. In this manner, the mode of motor energization is adjusted in accordance with a comparison of the actual stop profile to the nominal stop profile.

An output from any one of the AND gates 112-117, FIG. 6, provides an input to OR gate 118 and provides an active reset output on conductor 119. This reset output is effective to reset the active one of the two latches 106 and 107, FIG. 8.

This reset output is also effective to reset the active one of the distance checkpoint latches 69-71, it being remembered that one of these latches is effective only when the motor has passed the fourth, fifth or sixth tachometer pulse, but has not reached the next pulse.

Latches 108-111 of FIG. 8, when active, provide active outputs to AND gates 120-123. These AND gates are effective to provide a given duty cycle of dynamic brake/coast for the motor in accordance with the state of latches 108-111 and the state of fast latch 87 and slow latch 88 of FIG. 7.

Referring again to FIG. 6, AND gates 124-126 decode certain stages of counter 82 to provide a 50 percent duty cycle on conductor 127, a 25 percent duty cycle on conductor 128, and a 10 percent duty cycle on conductor 129. The waveform associated with each of the conductors 127-129 shows one cycle of output which appears on the respective conductor, the time period of the cycles being the same, and the active portion of a cycle being in the 50 percent, 25 percent and 10 percent relationship. By virtue of the conditioning inputs provided to AND gates 120-123 of FIG. 8, AND gates 120 and 123 may provide an active output of a 25 percent duty cycle; AND gate 121 may provide an active output of a 50 percent duty cycle; and AND gate 122 may provide an active output of a 10 percent duty cycle.

The outputs of AND gates 120-123 and the output of latch 106 are connected to OR gate 130 whose output, when active, provides for a dynamic brake mode of energization of motor 56, as indicated by the legend associated with conductor 131. Latch 107, when active, provides a plug mode of energization for motor 56, as indicated by the legend associated with conductor 132.

With reference to FIG. 9, it is assured that a forward direction of rotation is provided by transistors A and C being rendered conductive. A plug mode of operation is thus provided by rendering transistors B and D conductive. Whereas, a dynamic brake mode is provided by rendering transistors D and C conductive, and a coast mode is provided by turning all four transistors off.

Initially, upon the occurrence of a STOP command, latch 133 (FIG. 8) is set to provide continuous plugging of motor 56 until the occurrence of the fourth tachometer pulse, at which time latch 133 is reset.

As has been mentioned in connection with FIG. 5, the occurrence of the thirteenth tachometer pulse is effective to reset stop latch 74 and to provide an active output on conductor 76. An active output on conductor 76 is effective to condition AND gate 134 of FIG. 8 and thereby provide a continuous dynamic brake mode of operation for motor 56 from tachometer pulse 13 until the motor comes to rest at tachometer pulse 15.

Figure 10:
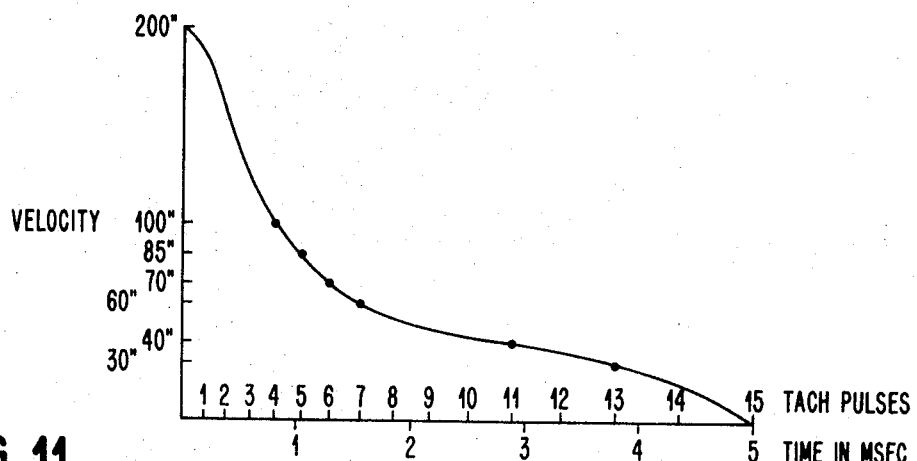
Figure 11:
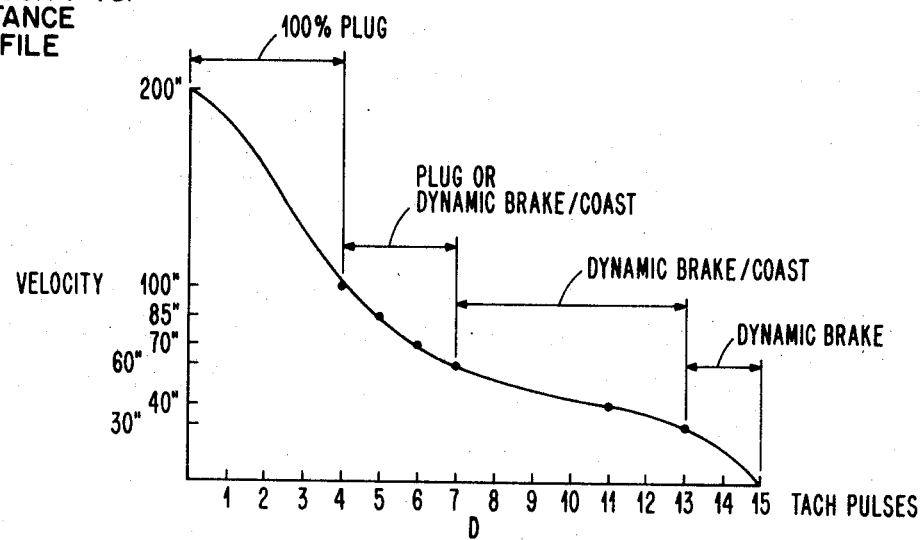

The above-described operation, and the various modes of energization of motor 56, produce, for example, the velocity-versus-time and the velocity-versus-distance profile shown in FIGS. 10 and 11, respectively.

While the above description as mentioned forwards rotation of motor 56, bidirectional rotation may be controlled as is well known to those of ordinary skill in the art.

While the invention has been particularly shown and described with reference to preferred embodiments thereof, it will be understood by those skilled in the art that various changes in form and details may be made

What is claimed is:

1. In a motor velocity servomechanism having motor feedback transducer means, means responsive to a GO command to accelerate the motor and to thereafter control motor velocity to a desired running value, and means responsive to a STOP command to decelerate the motor from the running value to zero velocity in a preselected manner; an improved deceleration control apparatus comprising;
   means responsive to the occurrence of said STOP command to energize said motor in a manner to achieve forced deceleration thereof,
   distance measuring means responsive to the distance traversed by said motor after the occurrence of said STOP command,
   means storing a nominal velocity-versus-distance stopping profile for said motor to thereby define the preselected manner of controlling the motor's velocity from the running value to zero,
   comparison means receiving as inputs the actual motor velocity and said stopping profile, and controlled by said distance measuring means to compare actual motor velocity at a known distance to the nominal motor velocity which should exist at that distance, and
   means controlled by said comparison means and effective to variably control said motor energization in a manner to achieve said stopping profile.

2. A motor servomechanism as defined in claim 1 wherein said distance measuring means is effective to establish a plurality of distance checkpoints at which said comparison means is effective to compare actual motor velocity at each distance checkpoint to a different nominal motor velocity at each of said checkpoints.

3. A motor servomechanism as defined in claim 2 wherein said motor is a direct current motor and said forced deceleration is a plugging mode of energization, and including means controlled by said distance measuring means to inhibit motor plugging energization while the actual motor velocity is greater than zero, and including means to thereafter dynamically brake said motor to zero velocity.

4. The method of speed controlling the stopping distance of DC motor comprising the steps of;
   responding to a motor STOP command and instituting plugging as a result thereof,
   measuring the distance traveled by the motor after the occurrence of the STOP command and selecting certain distances as speed checkpoints,
   making a comparison of actual motor speed at each checkpoint to a nominal speed which should exist at that checkpoint,
   deriving a speed error signal as a result of said comparison, and
   adjusting the mode of plugging as a function of said error signal and in a manner devised to achieve the desired nominal speed at the next checkpoint.

5. The method as defined in claim 4 including the step of selecting a final checkpoint which is shorter than said stopping distance and terminating plugging as a function thereof.

6. The method as defined in claim 5 including the step of dynamically braking the motor subsequent to said final checkpoint.

7. Servomechanism stop control apparatus for use in reducing the velocity of a direct current motor from a known running velocity to zero velocity in a given distance, comprising;
   means defining an optimum velocity-versus-distance stopping curve for said motor,
   means responsive to a desire to stop said motor and effective thereupon to institute plugging of said motor,
   distance measuring means controlled by said motor,
   velocity measuring means controlled by said motor,
   comparison means controlled by said distance measuring means, and receiving as inputs said optimum stopping curve and said velocity measuring means, said comparison means being effective to compare actual motor velocity to an optimum motor velocity defined by said stopping curve, and
   means controlled by said comparison means in accordance with said comparison to adjust the plugging of said motor in a manner devised to achieve said stopping curve.

8. A servomechanism as defined in claim 7 wherein said comparison means is controlled by said distance measuring means at a plurality of selected distances, and wherein said last named means adjusts the plugging of said motor in a manner devised to achieve said stopping curve at a subsequent distance checkpoint.

9. A servomechanism as defined in claim 8 including dynamic brake means effective to dynamically brake said motor to a stop, said dynamic brake means being rendered effective by said distance measuring means upon said motor reaching a final checkpoint at a distance less than said given distance.

10. In a data processing magnetic tape unit having a capstan, a direct current high torque — low inertia motor directly connected to the capstan, and tension means holding a length of tape in continuous engagement with the capstan; deceleration control apparatus to control the capstan stopping velocity in the interblock gap between blocks of tape data, comprising;
    means defining a desired capstan velocity-versus-stopping distance curve to control the length of the interblock gap,
    capstam distance measuring means,
    capstan velocity measuring means,
    control means for said motor receiving as inputs said first named means and said velocity measuring means, and being controlled by said distance measuring means to variably plug said motor in a manner devised to achieve the desired capstan velocity-versus-stopping distance curve during deceleration of said motor, and
    means responsive to said capstan traversing a distance less than said stopping distance and effective to terminate plugging of said motor and to institute dynamic braking thereof.

11. A magnetic tape unit as defined in claim 10 wherein said distance measuring means establishes a plurality of discretely spaced distance checkpoints, and wherein said control means variably controls said motor at each checkpoint in a manner devised to achieve the desired capstan velocity-versus-stopping distance curve at a subsequent checkpoint.

12. Stop control servomechanism apparatus, comprising;
    a motor whose stopping distance is to be controlled from a known velocity to zero velocity in accordance with a preselected velocity-versus-distance profile, means establishing said preselected velocity-versus-distance profile as a control reference, motor distance measuring means providing an output at a plurality of discrete distance checkpoints, motor velocity measuring means, and control means for said motor receiving as inputs said first named means and said velocity measuring means, and being controlled by said distance measuring means to compare said motor velocity to said control reference in accordance with the known distance parameter and to variably control said motor at each distance checkpoint in a manner devised to achieve the profile velocity at a subsequent distance checkpoint.

* * * * *